United States Patent
Zhao

(10) Patent No.: US 12,279,259 B2
(45) Date of Patent: Apr. 15, 2025

(54) FEEDBACK INFORMATION TRANSMISSION METHOD AND APPARATUS, AND DEVICE AND STORAGE MEDIUM

(71) Applicant: Beijing Xiaomi Mobile Software Co., Ltd., Beijing (CN)

(72) Inventor: Qun Zhao, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 554 days.

(21) Appl. No.: 17/595,757

(22) PCT Filed: May 24, 2019

(86) PCT No.: PCT/CN2019/088393
§ 371 (c)(1),
(2) Date: Nov. 23, 2021

(87) PCT Pub. No.: WO2020/237437
PCT Pub. Date: Dec. 3, 2020

(65) Prior Publication Data
US 2022/0217696 A1    Jul. 7, 2022

(51) Int. Cl.
H04W 72/20    (2023.01)
H04L 5/00     (2006.01)
H04W 4/06     (2009.01)

(52) U.S. Cl.
CPC .......... *H04W 72/20* (2023.01); *H04L 5/0048* (2013.01); *H04W 4/06* (2013.01)

(58) Field of Classification Search
CPC ........ H04W 72/20; H04W 4/06; H04L 5/0048
See application file for complete search history.

(56) References Cited

U.S. PATENT DOCUMENTS

| | | | |
|---|---|---|---|
| 10,568,124 B2 * | 2/2020 | Park | H04W 72/20 |
| 11,343,013 B2 * | 5/2022 | Nammi | H04L 5/0055 |
| 2014/0010172 A1 * | 1/2014 | Wei | H04W 76/14 |
| | | | 370/328 |
| 2015/0215848 A1 * | 7/2015 | Yang | H04W 48/14 |
| | | | 370/328 |
| 2017/0064680 A1 | 3/2017 | Chen et al. | |
| 2017/0280406 A1 * | 9/2017 | Sheng | H04W 4/40 |

(Continued)

FOREIGN PATENT DOCUMENTS

| | | | | |
|---|---|---|---|---|
| CN | 101611584 A | | 12/2009 | |
| CN | 102349273 A | * | 2/2012 | H04B 7/0634 |

(Continued)

OTHER PUBLICATIONS

"Sidelink Physical Structure for NR V2X Communication," Proceedings of the 3GPP TSG RAN WG1 Meeting #97, R1-1906794, Intel Corporation, May 13, 2019, Reno, Nevada, 20 pages.

(Continued)

*Primary Examiner* — Shean Tokuta
(74) *Attorney, Agent, or Firm* — McCoy Russell LLP

(57) ABSTRACT

A feedback information transmission method can include: selecting a basic sequence according to an information item of sidelink communication; generating feedback information of the sidelink communication according to the basic sequence; and transmitting the feedback information to a second terminal.

14 Claims, 5 Drawing Sheets

(56) References Cited

U.S. PATENT DOCUMENTS

| | | | | |
|---|---|---|---|---|
| 2018/0048446 | A1* | 2/2018 | Jiang | H04W 72/21 |
| 2019/0044667 | A1 | 2/2019 | Guo et al. | |
| 2019/0166592 | A1* | 5/2019 | Yang | H04L 5/0051 |
| 2019/0386788 | A1* | 12/2019 | Kwak | H04L 5/0048 |
| 2020/0196293 | A1* | 6/2020 | Liu | H04W 4/40 |
| 2021/0194741 | A1* | 6/2021 | Hao | H04L 27/26025 |
| 2021/0235430 | A1* | 7/2021 | Liu | H04W 4/00 |
| 2021/0297199 | A1* | 9/2021 | Miao | H04L 5/0023 |
| 2021/0344460 | A1* | 11/2021 | Park | H04W 72/20 |
| 2022/0014331 | A1* | 1/2022 | Peng | H04L 5/0048 |
| 2022/0140957 | A1* | 5/2022 | Kiilerich Pratas | H04L 5/0055 370/329 |
| 2022/0217696 | A1* | 7/2022 | Zhao | H04L 5/0051 |
| 2022/0303042 | A1* | 9/2022 | Wang | H04W 72/21 |
| 2022/0337355 | A1* | 10/2022 | Do | H04L 5/0055 |

FOREIGN PATENT DOCUMENTS

| | | | | |
|---|---|---|---|---|
| CN | 103517426 | A | | 1/2014 |
| CN | 104579545 | A | | 4/2015 |
| CN | 105981315 | A | | 9/2016 |
| CN | 108123785 | A | | 6/2018 |
| CN | 108400843 | A * | 8/2018 | H04L 1/16 |
| CN | 109644455 | A | | 4/2019 |
| CN | 110214427 | A * | 9/2019 | H04L 1/1607 |
| CN | 110383736 | A * | 10/2019 | H04L 1/1812 |
| CN | 112398610 | A * | 2/2021 | H04L 1/1607 |
| CN | 112448793 | A * | 3/2021 | |
| CN | 112583554 | A * | 3/2021 | H04L 5/001 |
| WO | 2013166697 | A1 | | 11/2013 |
| WO | WO-2017095187 | A1 * | 6/2017 | H04L 27/2607 |
| WO | WO-2018203686 | A1 * | 11/2018 | H04L 1/1671 |
| WO | WO-2019047243 | A1 * | 3/2019 | H04L 1/0073 |
| WO | 2019075238 | A1 | | 4/2019 |
| WO | WO-2019151915 | A1 * | 8/2019 | H03G 3/3078 |
| WO | WO-2020132869 | A1 * | 7/2020 | H04L 1/08 |
| WO | WO-2020136838 | A1 * | 7/2020 | H04L 1/1819 |
| WO | WO-2020136852 | A1 * | 7/2020 | H04L 1/1614 |
| WO | WO-2020142991 | A1 * | 7/2020 | H04L 1/1607 |
| WO | WO-2020142992 | A1 * | 7/2020 | H04L 5/0044 |
| WO | WO-2020164709 | A1 * | 8/2020 | H04L 1/1893 |
| WO | WO-2020215222 | A1 * | 10/2020 | H04L 1/1607 |
| WO | WO-2020220290 | A1 * | 11/2020 | H04L 1/08 |
| WO | WO-2020222266 | A1 * | 11/2020 | |
| WO | WO-2020222560 | A1 * | 11/2020 | H04L 1/0023 |
| WO | WO-2020237437 | A1 * | 12/2020 | H04L 1/1812 |
| WO | WO-2021057761 | A1 * | 4/2021 | H04L 5/001 |
| WO | WO-2021134798 | A1 * | 7/2021 | H04L 5/0048 |
| WO | WO-2021147864 | A1 * | 7/2021 | H04L 1/1812 |
| WO | WO-2022022593 | A1 * | 2/2022 | |

OTHER PUBLICATIONS

"Sidelink Physical Structure for NR V2X Communication," Proceedings of the 3GPP TSG RAN WG1 Meeting #97, R1-1907906, Revision of R1-1906794, Intel Corporation, May 13, 2019, Reno, Nevada, 21 pages.

"3GPP TS 38.211 V17.2.0," 3rd Generation Partnership Project, Technical Specification Group Radio Access Network, Physical channels and modulation, Release 17, Jun. 2022, 3 pages.

"Sidelink physical layer structure in NR V2X," Proceedings of the 3GPP TSG RAN WG1 Meeting #97, May 13, 2019, Reno, Nevada, 15 pages.

ISA China National Intellectual Property Administration, International Search Report Issued in Application No. PCT/CN2019/088393, Feb. 5, 2020, WIPO, 6 pages.

* cited by examiner

FEEDBACK INFORMATION TRANSMISSION METHOD AND APPARATUS, AND DEVICE AND STORAGE MEDIUM

CROSS REFERENCE TO RELATED APPLICATION

The present application is a U.S. National Phase of International Application No. PCT/CN2019/088393 entitled "FEEDBACK INFORMATION TRANSMISSION METHOD AND APPARATUS, AND DEVICE AND STORAGE MEDIUM," and filed on May 24, 2019. The entire contents of the above-listed application is hereby incorporated by reference for all purposes.

BACKGROUND AND SUMMARY

Vehicle to everything (V2X) enables sidelink communication between two terminals.

New Radio (NR) supports the use of a Hybrid Automatic Repeat Request (HARQ) mechanism by unicast and multicast services of sidelink communication in V2X.

According to an aspect of the disclosure, a feedback information transmission method is provided, is applied in a first terminal, and includes:
  selecting a basic sequence according to an information item of sidelink communication;
  generating feedback information of the sidelink communication according to the basic sequence; and
  transmitting the feedback information to a second terminal.

According to another aspect of the disclosure, a feedback information transmission method is provided, is applied in a second terminal, and includes:
  selecting a basic sequence according to an information item of sidelink communication; and
  receiving feedback information of the sidelink communication transmitted by a first terminal according to the basic sequence.

According to another aspect of the disclosure, a feedback information transmission method is provided, and includes:
  receiving configuration information of an access network device;
  determining a basic sequence according to the configuration information;
  generating feedback information of sidelink communication according to the basic sequence; and
  transmitting or receiving the feedback information.

According to yet another aspect of an example of the disclosure, a terminal is provided, and includes:
  a processor;
  a transceiver connected to the processor; and
  the processor configured to load and execute executable instructions to implement the feedback information transmission method executed by the terminal in the above aspects.

According to another aspect of an example of the disclosure, provided is a non-transitory computer-readable storage medium which stores at least one instruction, at least one program, a code set or an instruction set. The above at least one instruction, at least one program, code set or instruction set is loaded and executed by a processor to implement the feedback information transmission methods in the above aspects.

It should be understood that the above general description and the following detailed description are only exemplary and explanatory, and cannot limit the disclosure.

BRIEF DESCRIPTION OF THE DRAWINGS

The accompanying drawings herein, which are incorporated in and constitute a part of the description, illustrate some examples consistent with the disclosure and, together with the description, serve to explain the principles of the disclosure.

DETAILED DESCRIPTION

Figure 1:
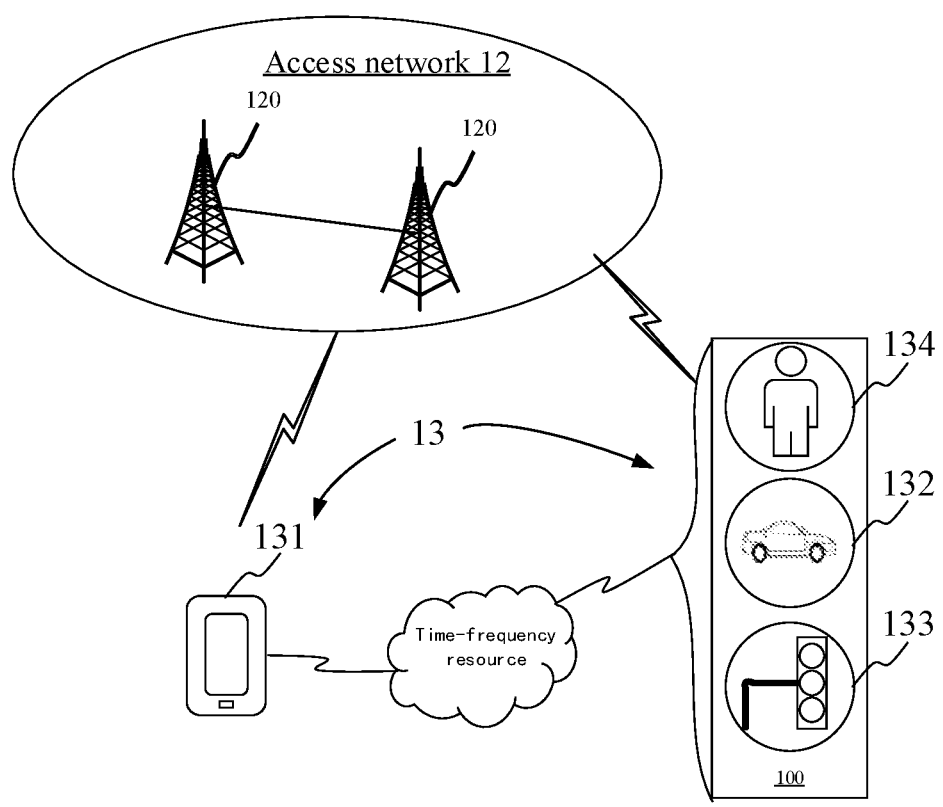
FIG. 1 is a structural block diagram illustrating a communication system supporting sidelink communication according to an example.

Examples will be described in detail herein, and examples are shown in the accompanying drawings. When the following description refers to the accompanying drawings, the same numeral in different figures refer to the same or similar elements unless otherwise indicated. The implementation modes described in the following examples do not represent all implementation modes consistent with the disclosure. On the contrary, they are merely examples of devices and methods consistent with some aspects of the disclosure as detailed in the appended claims.

In an LTE system, V2X sidelink communication can only support V2X applications in terms of some basic security, such as exchanging such as CAM (Cooperative Awareness Message) or DENM (Decentralized Environmental Notification Message) or other Basic Security Information (BSM). Recently, with the development of technologies such as automatic driving, new requirements are further provided for the performance of the V2X technology in order to support new V2X services. Support on new V2X communication services and scenarios with 5G NR technology has become an important matter. Some new services required to be met by V2X communication have been established in the related art, including vehicles platooning, extended sensors, advanced driving, and remote driving. In general, NR V2X sidelink communication needs to provide higher communication rates, shorter communication latency, and more reliable communication quality.

In the discussion of NR V2X, RAN1 resolves to support the use of a physical layer Hybrid Automatic Repeat Request (HARQ) feedback retransmission mechanism for unicast and multicast services of sidelink communication.

In the NR Uu uplink HARQ feedback process, it is defined that in a Physical Uplink Control Channel (PUCCH), two formats, i.e., format0 and format1, are adopted for HARQ feedback being less than or equal to 2 bits; and format0 uses one or two Orthogonal Frequency Division Multiplexing (OFDM) time domain symbols for transmission of HARQ feedback information. The use of shorter OFDM time domain symbols in the above description may be more advantageous from the perspective that NR V2X needs to support a large amount of services with strict latency requirements.

A specific format of NR PUCCH format0 is found in TS 38.211 6.3. 2.3. For format 0, the HARQ feedback information is transmitted using a sequence detection method. A format0 signal is a sequence with a length of 12, and occupies one PRB frequency domain resource for transmission. The sequence is obtained by cyclic shift of a basic sequence, and different cyclic shifts represent different feedback information.

Cyclic shift is performed on the basic sequence: $r^{\alpha}(n) = e^{j\alpha n}\bar{r}(n)$, $0 \leq n < M_{ZC}$, where $\alpha$ is a cyclic shift value, $\bar{r}$ is the basic sequence, and $M_{ZC}$ is a length of the basic sequence. In NR, 30 groups of basic sequences are defined for the length $M_{ZC}$, each group of basic sequence includes one or two subsequences. Different user devices may use the same basic sequence for PUCCH transmissions in the same cell at the same time; and user devices in different cells use different basic sequences to reduce interference.

In an LTE system, a base station schedules time-frequency resources such that different users in the same cell use orthogonal time-frequency resources; whereas in V2X sidelink communication, time-frequency resources of the system are shared for all V2X user devices, and meanwhile there is an absence of intermediate nodes for scheduling to enable allocated usage of corresponding orthogonal time-frequency resources for different user devices. If there are two pieces of feedback information from different user devices transmitted on the same time-frequency resource and using the same basic sequence, the two pieces of feedback information can cause strong interference, resulting in a decrease of communication performance.

The disclosure provides a feedback information transmission method which reduces the probability that user devices use the same basic sequence by randomizing the selection of the basic sequence to be capable of effectively avoiding using the same basic sequence by different user devices to transmit feedback information, so that reducing interference in the feedback information transmission process and improving communication performance.

FIG. 1 illustrates a structural block diagram of a communication system supporting sidelink communication provided by an example of the disclosure, and the communication system may include: an access network 12 and a terminal 13.

The access network 12 includes a plurality of access network devices 120. The access network device 120 may be a base station, and the base station is a device which is deployed in an access network to provide a wireless communication function for the terminal. The base station may include various forms of macro base stations, micro base stations, relay stations, access points, etc. In systems adopting different wireless access technologies, devices having the base station function may be named differently, for example, may be referred to as eNodeB or eNB in a Long Term Evolution (LTE) system, or referred to as gNodeB or gNB in a 5G NR system. As the communication technology evolves, the name "base station" may change. For the convenience of the examples, the above devices for providing the wireless communication function to the terminal are collectively referred to as access network devices.

The terminal 13 may include various handheld devices, vehicle mounted devices, wearable devices and computing devices having the wireless communication function, or other processing devices connected to a wireless modem, as well as various forms of User Equipment (UE), Mobile Stations (MS), terminal devices, and the like. For the convenience of description, the above-mentioned devices are collectively referred to as terminals. The access network devices 120 and the terminal 13 communicate with each other via a certain air interface technology, such as a Uu interface.

In an example of the application, the terminal 13 includes a vehicle 131, another vehicle 132, infrastructure 133 and a pedestrian 134.

Vehicle to Vehicle (V2V) refers to communication between the vehicle 131 and the other vehicle 132, the own vehicle sends own relevant information to the other vehicle, and the relevant information includes a driving speed, a geographic location, a driving direction, a driving status, etc.

Vehicle to Infrastructure (V2I) refers to communication between the vehicle 131 and the infrastructure 133, and the infrastructure includes all infrastructure encountered in the vehicle driving process, including building facilities such as traffic lights, bus stops, buildings, and tunnels.

Vehicle to Pedestrian (V2P) refers to communication between the vehicle 131 and the pedestrian 134. The pedestrian generally refers to an electronic device with the mobile communication capability carried by the pedestrian, such as a cell phone and a wearable device which includes a smart bracelet, a smart watch, a smart ring, etc.

In the example of the application, the vehicle 131 is referred to as a first terminal, the another vehicle 132, the infrastructure 133, and the pedestrian 134 are referred to as a second terminal for illustration, but the first terminal and the second terminal may also interchange in roles, which is not limited.

Optionally, the above first and second terminals both support sidelink communication, and the above communication system may be an NR system and a subsequent evolution system.

Figure 2:
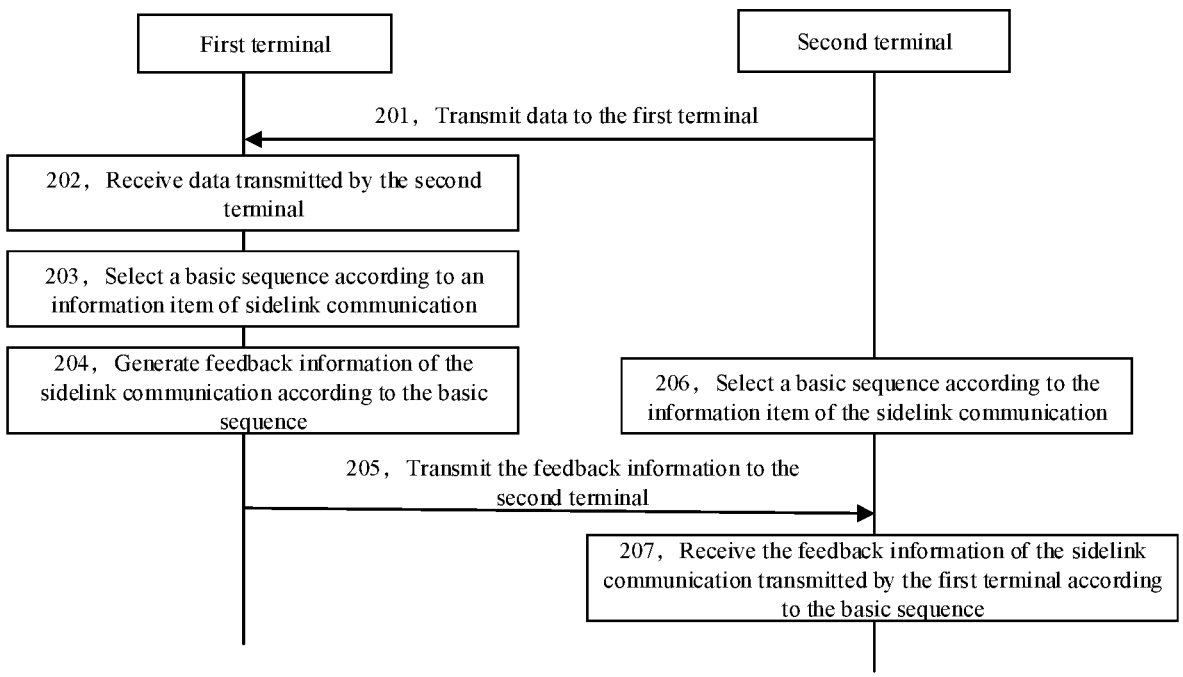
FIG. 2 is a flow chart illustrating a feedback information transmission method according to an example.

FIG. 2 illustrates a feedback information transmission method provided by an example of the disclosure, which includes the following steps.

Step 201, a second terminal transmits data to a first terminal.

Optionally, the data includes a Transport Block (TB).

In V2X communication, sidelink communication is adopted between the first terminal and the second terminal. The first terminal includes at least one of a vehicle, infrastructure and a pedestrian; and the pedestrian generally refers to an electronic device with the mobile communication capability carried by the pedestrian.

When the first terminal is a vehicle, the second terminal includes at least one of a vehicle, infrastructure, a pedestrian;

when the first terminal is infrastructure, the second terminal includes a vehicle; and when the first terminal is a pedestrian, the second terminal includes a vehicle.

In an HARQ process of sidelink communication, the second terminal transmits data to the first terminal.

Step 202, the first terminal receives data transmitted by the second terminal.

Step 203, the first terminal selects a basic sequence according to an information item of sidelink communication.

When receiving the above data, the first terminal selects the basic sequence according to the information item of the sidelink communication, and the basic sequence is configured to generate feedback information corresponding to the data.

Optionally, the first terminal selects the basic sequence according to the information item of the sidelink communication, which may include the following process:

the first terminal generates a first identity according to the information item of sidelink communication, and the information item of the sidelink communication is used for live or multicast communication between the first terminal and the second terminal.

Optionally, the above information item of sidelink communication includes at least one of the following information items:

a source ID of sidelink unicast communication;
a source ID of sidelink multicast communication;
a destination ID of the sidelink unicast communication;
a destination ID of the sidelink multicast communication;
a part of bit fields, bit fields or a combination of bit fields of SCI of the sidelink unicast communication;
a part of bit fields, bit fields or a combination of bit fields of SCI of the sidelink multicast communication;
location information of a time-frequency resource used for SCI transmission of the sidelink unicast communication;
location information of a time-frequency resource used for SCI transmission of the sidelink multicast communication;
location information of a time-frequency resource used for data transmission of the sidelink unicast communication;
location information of a time-frequency resource used for data transmission of the sidelink multicast communication;
a physical layer parameter used for the SCI transmission of the sidelink unicast communication;
a physical layer parameter used for the SCI transmission of the sidelink multicast communication;
a physical layer parameter used for the data transmission of the sidelink unicast communication; and
a physical layer parameter used for the data transmission of the sidelink multicast communication.

The source ID is a user identity of a transmission terminal; the destination ID is a user identity of a receiving terminal; the SCI is information for controlling the sidelink communication between the transmission terminal and the receiving terminal. In the example, the transmission terminal corresponding to feedback information in the sidelink communication is the second terminal, and the receiving terminal corresponding to the feedback information is the first terminal.

The first identity is used to select a basic sequence for carrying the feedback information; and in some examples, the first terminal generates the first identity according to the source IDs when the sidelink unicast communication or the sidelink multicast communication is performed between the first terminal and the second terminal;

or, the first identity is generated according to the destination IDs;

or, the first identity is generated according to the part of bit fields, bit fields or combination of the bit fields of the SCI, and the above bit fields include a Cyclic Redundancy Check (CRC) part generated after SCI channel coding;

or, the first identity is generated according to the source IDs and the destination IDs;

or, the first identity is generated according to the source IDs and the part of bit fields, bit fields or combination of the bit fields of the SCI;

or, the first identity is generated according to the destination IDs and the part of bit fields, bit fields or combination of the bit fields of the SCI;

or, the first identity is generated according to the source IDs, the destination IDs and the part of bit fields, bit fields or combination of the bit fields of the SCI;

or, the first identity is generated according to the location information of the time-frequency resource used for the SCI or data transmission;

or, the first identity is generated according to the physical layer parameter used for the SCI or data transmission;

or, the first identity is generated according to the location information of the time-frequency resource used for the SCI or data transmission and the bit fields of the SCI;

or, the first identity is generated according to the physical layer parameter used for the SCI or data transmission and the bit fields of the SCI.

Optionally, the above location information of the time-frequency resource used for the SCI transmission includes at least one of:

a time slot number for start of the SCI transmission;
a time slot number for end of the SCI transmission;
a PRB sequence number for start of a frequency domain of the SCI transmission;
a PRB sequence number for end of the frequency domain of the SCI transmission;
a sequence number of a subchannel for start of the frequency domain of the SCI transmission;
a sequence number of a subchannel for end of the frequency domain of the SCI transmission;
a length of a time domain resource occupied by the SCI transmission; and
a width of a frequency domain resource occupied by the SCI transmission.

Optionally, the above location information of the time-frequency resource used for the data transmission includes at least one of:

a time slot number for start of the data transmission;
a time slot number for end of the data transmission;
a PRB sequence number for start of a frequency domain of the data transmission;
a PRB sequence number for end of the frequency domain of the data transmission;
a sequence number of a subchannel for start of the frequency domain of the data transmission;
a sequence number of a subchannel for end of the frequency domain of the data transmission;
a length of a time domain resource occupied by the data transmission; and
a width of a frequency domain resource occupied by the data transmission.

Optionally, the above physical layer parameter used for the SCI transmission includes at least one of:

a sequence number of a DMRS for the SCI transmission;
a time-frequency resource mapping format of the DMRS for the SCI transmission; and
a bit length of the SCI.

Optionally, the above physical layer parameter used for the data transmission includes at least one of:

a sequence number of a DMRS for the data transmission; and a time-frequency resource mapping format of the DMRS for the data transmission.

A group number of the basic sequence is obtained by the first identity mod n by the first terminal, and the n is a group number of candidate basic sequences.

In the above sidelink unicast communication or multicast communication, n groups of candidate basic sequences can be selected by the first terminal to transmit feedback information.

The first terminal selects the basic sequence according to the group number.

Illustratively, the numbers of the n groups of candidate basic sequences are respectively 0 to n−1, and a mod value i is obtained by the above first identity mod n by the first terminal; and a candidate basic sequence with a group number i is selected as the basic sequence, where n is a positive integer, and i is an integer less than n.

For example, 30 candidate basic sequences are correspondingly used for the sidelink unicast communication or multicast communication, and groups numbers of the 30 candidate basic sequences are respectively 0-29; the first identity is a 16-bit string 01 which is 0000 0001 1100 0010, the string mod 30 is performed to obtain a mod value 0; and the first terminal selects a candidate basic sequence with a group number 0 as the basic sequence for carrying feedback information.

Step 204, the first terminal generates feedback information of the sidelink communication according to the basic sequence.

The above feedback information includes Acknowledgement (ACK) or Negative Acknowledgement (NACK).

In an example that a basic sequence in an NR PUCCH format0 is reused to transmit the feedback information, cyclic shift is performed on the basic sequence, and a value of bits of the feedback information mapped onto the sequence in the PUCCH format0 to obtain the feedback information of the sidelink communication.

Illustratively, cyclic shift is performed on the basic sequence by adopting the PUCCH format0 to obtain a sequence $x(1 \cdot N_{sc}^{RB}+n)$ in the PUCCH format0:

$$x(1 \cdot N_{sc}^{RB} + n) = r_{u,v}^{(\alpha,\delta)}(n),$$

$$n = 0, 1, 2, \ldots \ldots, N_{sc}^{RB} - 1,$$

$$\begin{cases} 1 = 0 & \text{single-symbol } PUCCH \text{ transmission,} \\ 1 = 0, 1 & \text{double-symbol } PUCCH \text{ transmission.} \end{cases}$$

In the example, $r_{u,v}^{(\alpha,\delta)}(n)$ is the basic sequence.

The above feedback information is generated according to Cyclic Redundancy Check (CRC), and the first terminal checks data by CRC to obtain a check result; and the value of the bits of the feedback information is generated according to the check result.

Step 205, the first terminal transmits the feedback information to the second terminal.

The first terminal transmits the feedback information to the second terminal by a Physical Sidelink Feedback Channel (PSFCH).

Step 206, the second terminal selects the basic sequence according to the information item of the sidelink communication.

Optionally, the second terminal selects the basic sequence according to the information item of the sidelink communication, which may include the following process:

the second terminal generates the first identity according to the information item of the sidelink communication, and the information item of the sidelink communication is used for live or multicast communication between the first terminal and the second terminal.

Optionally, the above information item of the sidelink communication includes at least one of the following information items:

a source ID of sidelink unicast communication;
a source ID of sidelink multicast communication;
a destination ID of the sidelink unicast communication;
a destination ID of the sidelink multicast communication;
a part of bit fields, bit fields or a combination of bit fields of SCI of the sidelink unicast communication;
a part of bit fields, bit fields or a combination of bit fields of SCI of the sidelink multicast communication;
location information of a time-frequency resource used for SCI transmission of the sidelink unicast communication;
location information of a time-frequency resource used for SCI transmission of the sidelink multicast communication;
location information of a time-frequency resource used for data transmission of the sidelink unicast communication;
location information of a time-frequency resource used for data transmission of the sidelink multicast communication;
a physical layer parameter used for the SCI transmission of the sidelink unicast communication;
a physical layer parameter used for the SCI transmission of the sidelink multicast communication;
a physical layer parameter used for the data transmission of the sidelink unicast communication; and
a physical layer parameter used for the data transmission of the sidelink multicast communication.

Optionally, the above location information of the time-frequency resource used for the SCI transmission includes at least one of:

a time slot number for start of the SCI transmission;
a time slot number for end of the SCI transmission;
a PRB sequence number for start of a frequency domain of the SCI transmission;
a PRB sequence number for end of the frequency domain of the SCI transmission;
a sequence number of a subchannel for start of the frequency domain of the SCI transmission;
a sequence number of a subchannel for end of the frequency domain of the SCI transmission;
a length of a time domain resource occupied by the SCI transmission; and
a width of a frequency domain resource occupied by the SCI transmission.

Optionally, the above location information of the time-frequency resource used for the data transmission includes at least one of:

a time slot number for start of the data transmission;
a time slot number for end of the data transmission;
a PRB sequence number for start of a frequency domain of the data transmission;
a PRB sequence number for end of the frequency domain of the data transmission;
a sequence number of a subchannel for start of the frequency domain of the data transmission;
a sequence number of a subchannel for end of the frequency domain of the data transmission;

a length of a time domain resource occupied by the data transmission; and a width of a frequency domain resource occupied by the data transmission.

Optionally, the above physical layer parameter used for the SCI transmission includes at least one of:

a sequence number of a DMRS for the SCI transmission;

a time-frequency resource mapping format of the DMRS for the SCI transmission; and a bit length of the SCI.

Optionally, the above physical layer parameter used for the data transmission includes at least one of:

a sequence number of a DMRS for the data transmission; and a time-frequency resource mapping format of the DMRS for the data transmission.

A group number of the basic sequence is obtained by the first identity mod n by the second terminal, and n is a group number of candidate basic sequences.

The second terminal selects the basic sequence according to the group number.

It should be noted that the step 206 may be executed before the step 205 or after the step 205.

Step 207, the second terminal receives the feedback information of the sidelink communication transmitted by the first terminal according to the basic sequence.

To sum up, according to the feedback information transmission method provided by the example, the first terminal and the second terminal select the basic sequence through the information item of the sidelink communication to transmit the feedback information in the HARQ transmission mechanism; and by randomizing the selection of the basic sequence using the information item of the sidelink communication, the probability that user devices choose to use the same time-frequency resource is reduced, and by using orthogonal basic sequences, it is guaranteed that the transmission of the feedback information between the user devices cannot produce strong interference.

In some examples, with respect to the generation of the first identity, in the case of the sidelink unicast communication or the sidelink multicast communication, the first terminal or the second terminal may, from at least one of the source ID, the destination ID, and the part of bit fields, bit fields, or combination of bit fields of the SCI, obtain m bits which are combined to form the first identity.

Illustratively, when the first terminal or the second terminal generates the first identity according to the source ID, assuming that the source ID has 8 bits, the same two 8 bits are respectively set in high 8 bits and low 8 bits, and are combined to form a 16-bit first identity, for example, a source ID is 0001 0111, and a first identity is 0001 0111 0001 0111 by combination.

Alternatively, assuming that the source ID has 16 bits, the above 16 bits are determined as the first identity.

Alternatively, assuming that the source ID has 24 bits, a 16-bit first identity is formed by combination of 8 bits from the head portion of the above 24 bits being set in the high 8 bits (low 8 bits), and 8 bits from the tail portion of the 24 bits being set in the low 8 bits (high 8 bits), for example, the source ID is 1011 0001 0101 1001 0110 0001, and thus a combined first identity is 1011 0001 0110 0001.

When the first terminal or the second terminal generates the first identity according to the destination ID, the generation manner may refer to the above manner of generating the first identity according to the source ID, which is not described in detail herein.

When the first terminal or the second terminal generates the first identity according to the part of bit fields, bit fields or combination of bit fields of the SCI, assuming that SCI includes a bit field 1 and a bit field 2, the bit field 1 is a 5-bit bit field occupied by a Modulation and Coding Scheme (MCS) index value, the bit field 2 is a 10-bit bit field occupied by a time-resource resource indicating data transmission; the 5 bits of the bit field 1 or the 10 bits of the bit field 2 may be determined as a first identity; and also, high 3 bits (low 3 bits) in the bit field 1 may be intercepted to set at high order, and low 5 bits (high 5 bits) in the bit field 2 may be intercepted to be set at low order, thus forming a 8-bit first identity. For example, the bit field 1 is 1 0100, the bit field 2 is 11 1001 0011, and thus a combined first identity is 1011 0011.

When the first terminal or the second terminal generates the first identity according to the source ID and the destination ID, assuming that the source ID has 8 bits, the destination ID has 8 bits; 8 bits of the source ID is set in high 8 bits (low 8 bits), 8 bits of the destination ID is set in low 8 bits (high 8 bits), thus generating a 16-bit identity which is the first identity.

When the first terminal or the second terminal generates the first identity according to the source ID and the part of bit fields, bit fields or combination of bit fields of the SCI, or according to the destination ID and the part bit fields, bit fields or combination of bit fields of the SCI, the generation manner may refer to the above manner of generating the first identity according to the source ID and the destination ID, which is not described in detail herein.

It should be noted that the first terminal and the second terminal select the basic sequence in the same manner, it can be guaranteed that a user device receiving the above feedback information can accurately determine the corresponding basic sequence while guaranteeing that different user devices select different orthogonal basic sequences for feedback information transmission, thus obtaining the feedback information.

Based on FIG. 2, since the basic sequence corresponding to the group number may include a first basic sequence, or include the first basic sequence and a second basic sequence, the first terminal selects the first basic sequence when the basic sequence corresponding to the group number includes the first basic sequence; and the first basic sequence is selected, or the second basic sequence is selected when the basic sequence corresponding to the group number includes the first basic sequence and the second basic sequence.

In some examples, when the basic sequence corresponding to the group number includes the first basic sequence and the second basic sequence, the first terminal or the second terminal selects the basic sequence according to the group number, which may include the following step:

generating a pseudo-random number.

Optionally, the illustrative steps of generating the pseudo-random number are as follows.

a pseudo-random sequence is initialized by adopting the first identity or a second identity to obtain an initialized pseudo-random sequence, and the second identity is different from the first identity.

A sequence number is generated according to a time domain unit in which feedback information is located.

The pseudo-random number is generated according to the sequence number and the initialized pseudo-random sequence.

Illustratively, the pseudo-random sequence is initialized, the generic pseudo-random sequence is defined by a Gold sequence having a length being 31, and when a length of an output sequence c(n) is $M_{PN}$, and n=0, 1, ..., $M_{PN}$−1, c(n) is defined as:

$$c(n)=(x_1(n+N_C)+x_2(n+N_C))\bmod 2$$

$$x_1(n+31)=(x_1(n+3)+x_1(n))\bmod 2$$

$$x_2(n+31)=(x_2(n+3)+x_2(n+2)+x_2(n+1)+x_2(n))\bmod 2.$$

When $N_C$=1600, a first m sequence $x_1(n)$ is initialized as $x_1(0)$=1, $x_1(n)$=0 where n=0, 1, ..., 30; and the initialized result of a second m sequence $x_2(n)$ depends on $c_{init}=\Sigma_{i=0}^{30}x_2(i)\cdot 2^i$.

The first basic sequence or the second basic sequence is selected according to the pseudo-random number Illustratively, the first terminal or the second terminal obtains a pseudo-random number 0 or 1 according to the sequence number and the initialized pseudo-random sequence; and when the obtained pseudo-random number is 0 (1), the first basic sequence is selected; and when the obtained pseudo-random number is 1 (0), the second basic sequence is selected.

Figure 3:
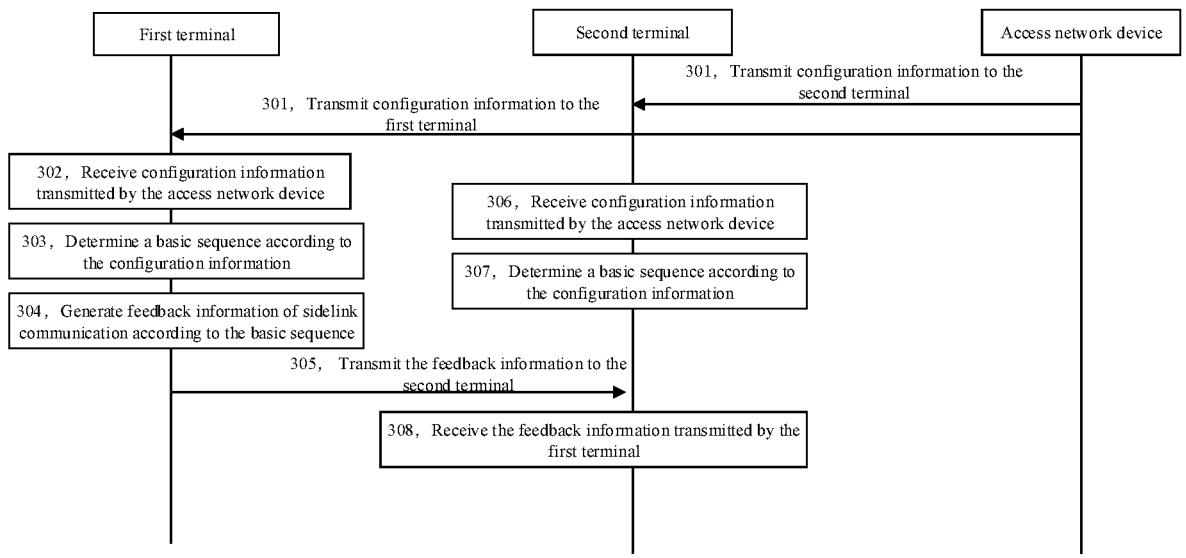
FIG. 3 is a flow chart illustrating a feedback information transmission method according to another example.

It should also be noted that in the process of the sidelink unicast communication or the sidelink multicast communication between the first terminal and the second terminal, the first terminal and the second terminal may also select the basic sequence according to configuration information issued by an access network device. As shown in FIG. 3 which illustrates a feedback information transmission method according to another example of the disclosure, the method includes:

Step 301, the access network device transmits configuration information to a first terminal and a second terminal.

The access network device transmits the configuration information to the first terminal and the second terminal through a Physical Downlink Control Channel (PDCCH).

The above configuration information is used to select a basic sequence. In the example, the process of generating the above configuration information by the access network device is not limited. It should be noted that the generation process of the above configuration information may be the generation process of the first identity as shown in FIG. 2, or the generation process of the group number corresponding to the basic sequence.

Step 302, the first terminal receives the configuration information of the access network device.

The first terminal receives the configuration information transmitted by the access network device through the PDCCH.

Step 303, the first terminal determines a basic sequence according to the configuration information.

Optionally, the above configuration information is generated according to an information item of sidelink communication.

In some examples, the above configuration information includes a first identity, and so that, an example of the step that the first terminal determines the basic sequence according to the configuration information may be as follows.

A group number of the basic sequence is obtained by the first identity mod n by the first terminal, and n is a group number of candidate basic sequences.

The first terminal selects the basic sequence according to the group number.

In some examples, when the basic sequence corresponding to the group number includes a first basic sequence, the first basic sequence is selected; and when the basic sequence corresponding to the group number includes the first basic sequence and a second basic sequence, the first basic sequence is selected, or the second basic sequence is selected.

Illustratively, when the basic sequence corresponding to the group number includes the first basic sequence and the second basic sequence, the first terminal generates a pseudo-random number; and the first basic sequence or the second basic sequence is selected according to the pseudo-random number.

The generation process of the pseudo-random number is as follows:

the first terminal initializes a pseudo-random sequence by adopting the first identity or a second identity to obtain an initialized pseudo-random sequence, and the second identity being different from the first identity;

the first terminal generates a sequence number according to a time domain unit in which feedback information is located; and the pseudo-random number is generated according to the sequence number and the initialized pseudo-random sequence.

Step 304, the first terminal generates feedback information of the sidelink communication according to the basic sequence.

Step 305, the first terminal transmits the feedback information to the second terminal.

Step 306, the second terminal receives the configuration information of the access network device.

The second terminal receives the configuration information transmitted by the access network device through the PDCCH.

Step 307, the second terminal determines the basic sequence according to the configuration information.

The step refers to the process that the first terminal determines the basic sequence according to the configuration information in the above step 303, which is not described in detail herein.

It should be noted that the steps 306-307 may be executed before the step 305, or may be executed after the step 305.

Step 308, the second terminal receives the feedback information transmitted by the first terminal.

The second terminal receives the feedback information of the sidelink communication transmitted by the first terminal according to the basic sequence.

To sum up, according to the feedback information transmission method provided by the example, the first terminal and the second terminal select the basic sequence through the configuration information of the access network device to transmit the feedback information in the HARQ transmission mechanism; and by randomizing the selection of the basic sequence using the configuration information, the probability that user devices choose to use the same time-frequency resource is reduced, and by using orthogonal basic sequences, it is guaranteed that the transmission of the feedback information between the user devices cannot produce strong interference.

Figure 4:
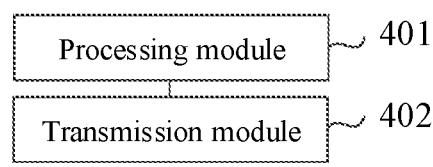
FIG. 4 is a block diagram illustrating a feedback information transmission apparatus according to an example.

FIG. 4 illustrates a feedback information transmission apparatus according to an example of the disclosure. The apparatus may be implemented as a part or all of a terminal by software, hardware or a combination of software and hardware. The apparatus includes:

a processing module 401 configured to select a basic sequence according to an information item of sidelink communication;

the processing module 401 configured to generate feedback information of the sidelink communication according to the basic sequence; and a transmission module 402 configured to transmit the feedback information to a second terminal.

In some examples, the information item of the sidelink communication includes at least one of the following information items:
- a source ID of sidelink unicast communication;
- a source ID of sidelink multicast communication;
- a destination ID of the sidelink unicast communication;
- a destination ID of the sidelink multicast communication;
- a part of bit fields, bit fields or a combination of bit fields of SCI of the sidelink unicast communication;
- a part of bit fields, bit fields or a combination of bit fields of SCI of the sidelink multicast communication;
- location information of a time-frequency resource used for SCI transmission of the sidelink unicast communication;
- location information of a time-frequency resource used for SCI transmission of the sidelink multicast communication;
- location information of a time-frequency resource used for data transmission of the sidelink unicast communication;
- location information of a time-frequency resource used for data transmission of the sidelink multicast communication;
- a physical layer parameter used for the SCI transmission of the sidelink unicast communication;
- a physical layer parameter used for the SCI transmission of the sidelink multicast communication;
- a physical layer parameter used for the data transmission of the sidelink unicast communication; and
- a physical layer parameter used for the data transmission of the sidelink multicast communication.

In some examples, the location information of the time-frequency resource used for the SCI transmission includes at least one of the following information:
- a time slot number for start of the SCI transmission;
- a time slot number for end of the SCI transmission;
- a PRB sequence number for start of a frequency domain of the SCI transmission;
- a PRB sequence number for end of the frequency domain of the SCI transmission;
- a sequence number of a subchannel for start of the frequency domain of the SCI transmission;
- a sequence number of a subchannel for end of the frequency domain of the SCI transmission;
- a length of a time domain resource occupied by the SCI transmission; and
- a width of a frequency domain resource occupied by the SCI transmission.

In some examples, the location information of the time-frequency resource used for the data transmission includes at least one of the following information:
- a time slot number for start of the data transmission;
- a time slot number for end of the data transmission;
- a PRB sequence number for start of a frequency domain of the data transmission;
- a PRB sequence number for end of the frequency domain of the data transmission;
- a sequence number of a subchannel for start of the frequency domain of the data transmission;
- a sequence number of a subchannel for end of the frequency domain of the data transmission;
- a length of a time domain resource occupied by the data transmission; and
- a width of a frequency domain resource occupied by the data transmission.

In some examples, the physical layer parameter used for the SCI transmission includes at least one of the following parameters:
- a sequence number of a DMRS for the SCI transmission;
- a time-frequency resource mapping format of the DMRS for the SCI transmission; and
- a bit length of the SCI.

In some examples, the physical layer parameter used for the data transmission includes at least one of the following parameters:
- a sequence number of a DMRS for the data transmission; and
- a time-frequency resource mapping format of the DMRS for the data transmission.

In some examples, the processing module 401 is configured to: generate a first identity according to the information item of the sidelink communication; perform the first identity mod n to obtain a group number of the basic sequence, the n being a group number of candidate basic sequences; and select the basic sequence according to the group number.

In some examples, the processing module 401 is configured to: select a first basic sequence when the basic sequence corresponding to the group number includes the first basic sequence; and select the first basic sequence, or select a second basic sequence when the basic sequence corresponding to the group number includes the first basic sequence and the second basic sequence.

In some examples, the processing module 401 is configured to: generate a pseudo-random number when the basic sequence corresponding to the group number includes the first basic sequence and the second basic sequence; and select the first basic sequence or the second basic sequence according to the pseudo-random number.

In some examples, the processing module 401 is further configured to: initialize a pseudo-random sequence by adopting the first identity or a second identity to obtain an initialized pseudo-random sequence; generate a sequence number according to a time domain unit in which feedback information is located; and generate the pseudo-random number according to the sequence number and the initialized pseudo-random sequence, the second identity being different from the first identity.

To sum up, when the feedback information transmission apparatus provided by the example is in sidelink communication with a second terminal, the apparatus selects the basic sequence according to the information item of the sidelink communication to transmit the feedback information in the HARQ transmission mechanism; and by randomizing the selection of the basic sequence using the information item of the sidelink communication, the probability that user devices choose to use the same time-frequency resource is reduced, and by using orthogonal basic sequences, it is guaranteed that the transmission of the feedback information between the user devices cannot produce strong interference.

Figure 5:
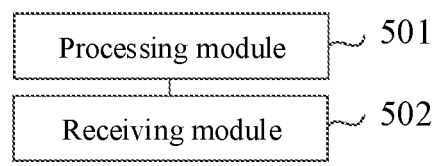
FIG. 5 is a block diagram illustrating a feedback information transmission apparatus according to another example.

FIG. 5 illustrates a feedback information transmission apparatus according to another example of the disclosure. The apparatus may be implemented as a part or all of a terminal by software, hardware or a combination of software and hardware. The apparatus includes:
- a processing module 501 configured to select a basic sequence according to an information item of sidelink communication; and
- a receiving module 502 configured to receive feedback information of the sidelink communication transmitted by a first terminal according to the basic sequence.

In some examples, the information item of the sidelink communication includes at least one of the following information items:
- a source ID of sidelink unicast communication;
- a source ID of sidelink multicast communication;
- a destination ID of the sidelink unicast communication;
- a destination ID of the sidelink multicast communication;
- a part of bit fields, bit fields or a combination of bit fields of SCI of the sidelink unicast communication;
- a part of bit fields, bit fields or a combination of bit fields of SCI of the sidelink multicast communication;
- location information of a time-frequency resource used for SCI transmission of the sidelink unicast communication;
- location information of a time-frequency resource used for SCI transmission of the sidelink multicast communication;
- location information of a time-frequency resource used for data transmission of the sidelink unicast communication;
- location information of a time-frequency resource used for data transmission of the sidelink multicast communication;
- a physical layer parameter used for the SCI transmission of the sidelink unicast communication;
- a physical layer parameter used for the SCI transmission of the sidelink multicast communication;
- a physical layer parameter used for the data transmission of the sidelink unicast communication; and
- a physical layer parameter used for the data transmission of the sidelink multicast communication.

In some examples, the location information of the time-frequency resource used for the SCI transmission includes at least one of the following information:
- a time slot number for start of the SCI transmission;
- a time slot number for end of the SCI transmission;
- a PRB sequence number for start of a frequency domain of the SCI transmission;
- a PRB sequence number for end of the frequency domain of the SCI transmission;
- a sequence number of a subchannel for start of the frequency domain of the SCI transmission;
- a sequence number of a subchannel for end of the frequency domain of the SCI transmission;
- a length of a time domain resource occupied by the SCI transmission; and
- a width of a frequency domain resource occupied by the SCI transmission.

In some examples, the location information of the time-frequency resource used for the data transmission includes at least one of the following information:
- a time slot number for start of the data transmission;
- a time slot number for end of the data transmission;
- a PRB sequence number for start of a frequency domain of the data transmission;
- a PRB sequence number for end of the frequency domain of the data transmission;
- a sequence number of a subchannel for start of the frequency domain of the data transmission;
- a sequence number of a subchannel for end of the frequency domain of the data transmission;
- a length of a time domain resource occupied by the data transmission; and
- a width of a frequency domain resource occupied by the data transmission.

In some examples, the physical layer parameter used for the SCI transmission includes at least one of the following parameters:
- a sequence number of a DMRS for the SCI transmission;
- a time-frequency resource mapping format of the DMRS for the SCI transmission; and
- a bit length of the SCI.

In some examples, the physical layer parameter used for the data transmission includes at least one of the following parameters:
- a sequence number of a DMRS for the data transmission; and
- a time-frequency resource mapping format of the DMRS for the data transmission.

In some examples, the processing module 501 is configured to: generate a first identity according to the information item of the sidelink communication; perform the first identity mod n to obtain a group number of the basic sequence, the n being a group number of candidate basic sequences; and select the basic sequence according to the group number.

In some examples, the processing module 501 is configured to: select a first basic sequence when the basic sequence corresponding to the group number includes the first basic sequence; and select the first basic sequence, or select a second basic sequence when the basic sequence corresponding to the group number includes the first basic sequence and the second basic sequence.

In some examples, the processing module 501 is configured to: generate a pseudo-random number when the basic sequence corresponding to the group number includes the first basic sequence and the second basic sequence; and select the first basic sequence or the second basic sequence according to the pseudo-random number.

In some examples, the processing module 501 is further configured to: initialize a pseudo-random sequence by adopting the first identity or a second identity to obtain an initialized pseudo-random sequence; generate a sequence number according to a time domain unit in which feedback information is located; and generate the pseudo-random number according to the sequence number and the initialized pseudo-random sequence, the second identity being different from the first identity.

To sum up, when the feedback information transmission apparatus provided by the example is in sidelink communication with a first device, the apparatus selects the basic sequence according to the information item of the sidelink communication to transmit the feedback information in the HARQ transmission mechanism; and by randomizing the selection of the basic sequence using the information item of the sidelink communication, the probability that user devices choose to use the same time-frequency resource is reduced, and by using orthogonal basic sequences, it is guaranteed that the transmission of the feedback information between the user devices cannot produce strong interference.

In addition, the apparatus selects the basic sequence in the same manner as the first terminal, while guaranteeing that different user devices select different orthogonal basic sequences for feedback information transmission, it is also guaranteed that the user equipment receiving the above feedback information can accurately determine the corresponding base sequence, so that obtaining the feedback information.

Figure 6:
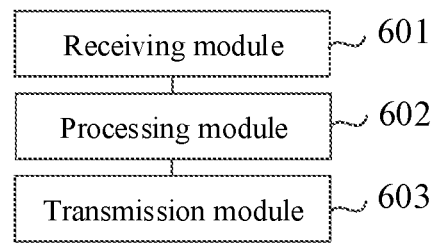
FIG. 6 is a block diagram illustrating a feedback information transmission apparatus according to yet another example.

FIG. 6 illustrates a feedback information transmission apparatus according to yet another example of the disclosure. The apparatus may be implemented as a part or all of a terminal by software, hardware or a combination of software and hardware. The apparatus includes:
- a receiving module 601 configured to receive configuration information of an access network device;
- a processing module 602 configured to determine a basic sequence according to the configuration information;
- the processing module 602 configured to generate feedback information of sidelink communication according to the basic sequence; and
- a transmission module 603 configured to transmit or receive the feedback information, or the receiving module 601 configured to receive the feedback information.

To sum up, according to the feedback information transmission apparatus provided by the example, in the sidelink communication process, the basic sequence is selected according to the configuration information of the access network device to transmit the feedback information in the HARQ transmission mechanism; and by randomizing the selection of the basic sequence using the configuration information, the probability that user devices choose to use the same time-frequency resource is reduced, and by using orthogonal basic sequences, it is guaranteed that the transmission of the feedback information between the user devices cannot produce strong interference.

Figure 7:
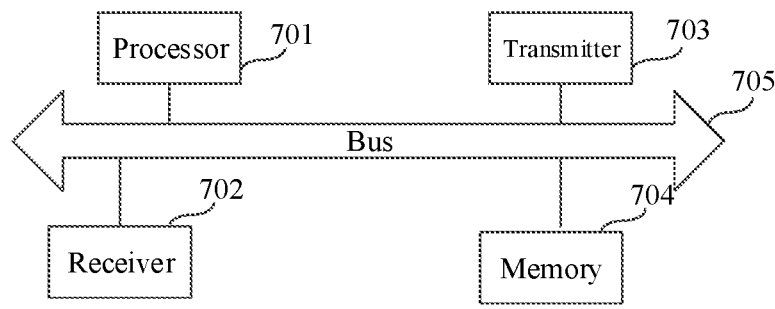
FIG. 7 is a structural schematic diagram illustrating a terminal according to an example.

FIG. 7 illustrates a structural schematic diagram of a terminal provided by an example. The terminal includes: a processor 701, a receiver 702, a transmitter 703, a memory 704 and a bus 705.

The processor 701 includes one or more than one processing cores, and executes software programs and modules to perform various function applications and information processing.

The receiver 702 and the transmitter 703 may be implemented as a communication component which may be a communication chip.

The memory 704 is connected to the processor 701 by the bus 705.

The memory 704 may be used to store at least one instruction which is executed by the processor 701 to implement various steps in the above method examples.

Furthermore, the memory 704 may be implemented by any type of volatile or non-volatile storage devices, or a combination of them, the volatile or non-volatile storage devices include, but are not limited to, a magnetic or optical disk, an Electrically Erasable Programmable Read-Only Memory (EEPROM), an Erasable Programmable Read-Only Memory (EPROM), a Static Random Access Memory (SRAM), a Read Only Memory (ROM), a magnetic memory, a flash memory, a Programmable Read-Only Memory (PROM).

In an example, provided is a non-transitory computer-readable storage medium, for example, a memory including an instruction which may be executed by a processor of a terminal to complete the method performed by the terminal side in the above feedback information transmission method. For example, the non-transitory computer-readable storage medium may be an ROM, a Random Access Memory (RAM), a CD-ROM, a magnetic tape, a floppy disk, an optical data storage device, or the like.

According to a non-transitory computer-readable storage medium, when an instruction of the non-transitory computer-readable storage medium is executed by the processor of the terminal, the terminal can perform the above feedback information transmission method.

Figure 8:
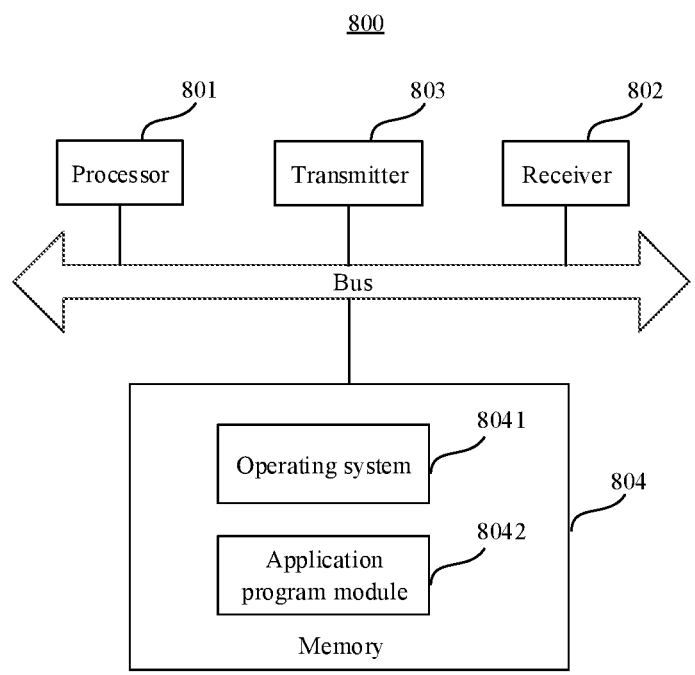
FIG. 8 is a block diagram illustrating an access network device according to an example.

FIG. 8 is a block diagram illustrating an access network device 800 according to an example. The access network device 800 may be a base station.

The access network device 800 may include a processor 801, a receiver 802, a transmitter 803 and a memory 804. The receiver 802, the transmitter 803 and the memory 804 are respectively connected to the processor 801 by a bus.

The processor 801 includes one or more processing cores, and executes software programs and modules to perform the method performed by the access network device in the feedback information transmission method provided by the example of the disclosure. The memory 804 may be used to store software programs and modules. In particular, the memory 804 may store an operating system 8041, at least one application module 8042 required for functions. The receiver 802 is used to receive communication data transmitted by other devices, and the transmitter 803 is used to transmit the communication data to other devices.

An example of the disclosure further provides a feedback information transmission system (also called communication system) which includes a first terminal, a second terminal and an access network device;
- the first terminal includes the feedback information transmission apparatus provided by the example as shown in FIG. 4 or 6; and
- the second terminal includes the feedback information transmission apparatus provided by the example as shown in FIG. 5 or 6.

An example of the disclosure further provides a feedback information transmission system (also called communication system). A downlink signal receiving system includes a terminal and an access network device;
- the terminal includes the first terminal and the second terminal provided by the example as shown in FIG. 1; and
- the access network device includes the access network device provided by the example as shown in FIG. 1.

An example of the disclosure also provides a computer-readable storage medium which stores at least one instruction, at least one program, a code set or an instruction set. The above at least one instruction, at least one program, code set or instruction is loaded and executed by a processor to implement the steps performed by the terminal or the access network device in the feedback information transmission methods provided by the above method examples.

It should be understood that "a plurality of" mentioned herein refer to two or more than two. "And/or" describes an association relationship of associated objects and indicates that three types of relationships may exist, for example, A and/or B may indicate that A exists alone, A and B exist at the same time, and B alone exists. A character "/" generally indicates that the associated objects before and after "/" are in an "or" relationship.

After considering the description and practicing the disclosure disclosed herein, those skilled in the art will easily think of other examples of the disclosure. The disclosure is intended to cover any variations, uses or adaptive changes of the disclosure following the general principles of the disclosure and including common general knowledge or customary technical means in the art, which are not disclosed by the disclosure. The description and the examples are exemplary only, and the true scope and spirit of the disclosure are indicated by the following claims.

It should be understood that the disclosure is not limited to the precise construction that has been described above and illustrated in the accompanying drawings, and that various modifications and changes may be made without departing from the scope of the disclosure. The scope of the disclosure is to be limited only by the following claims.

The invention claimed is:

1. A feedback information transmission method, being applied in a first terminal and comprising:
   selecting a basic sequence according to an information item of sidelink communication;
   generating feedback information of the sidelink communication according to the basic sequence; and
   transmitting the feedback information to a second terminal;
   wherein selecting the basic sequence according to the information item of the sidelink communication comprises:
      generating a first identity according to the information item of the sidelink communication;
      performing the first identity mod n to obtain a group number of the basic sequence, the n being a group number of candidate basic sequences; and
      selecting the basic sequence according to the group number; and
   wherein selecting the basic sequence according to the group number comprises:
      selecting a first basic sequence when the basic sequence corresponding to the group number comprises the first basic sequence;
      selecting the first basic sequence, or selecting a second basic sequence when the basic sequence corresponding to the group number comprises the first basic sequence and the second basic sequence; or
      generating a pseudo-random number when the basic sequence corresponding to the group number comprises a first basic sequence and a second basic sequence; and selecting the first basic sequence or the second basic sequence according to the pseudo-random number.

2. The feedback information transmission method according to claim 1, wherein the information item of the sidelink communication comprises at least one of the following information items:
   a source ID of sidelink unicast communication;
   a source ID of sidelink multicast communication;
   a destination ID of the sidelink unicast communication;
   a destination ID of the sidelink multicast communication;
   a part of bit fields, bit fields or a combination of bit fields of Sidelink Control Information (SCI) of the sidelink unicast communication;
   a part of bit fields, bit fields or a combination of bit fields of SCI of the sidelink multicast communication;
   location information of a time-frequency resource used for SCI transmission of the sidelink unicast communication;
   location information of a time-frequency resource used for SCI transmission of the sidelink multicast communication;
   location information of a time-frequency resource used for data transmission of the sidelink unicast communication;
   location information of a time-frequency resource used for data transmission of the sidelink multicast communication;
   a physical layer parameter used for the SCI transmission of the sidelink unicast communication;
   a physical layer parameter used for the SCI transmission of the sidelink multicast communication;
   a physical layer parameter used for the data transmission of the sidelink unicast communication; and
   a physical layer parameter used for the data transmission of the sidelink multicast communication.

3. The feedback information transmission method according to claim 2, wherein the physical layer parameter used for the data transmission comprises at least one of the following parameters:
   a sequence number of a Demodulation Reference Signal (DMRS) for the data transmission; and
   a time-frequency resource mapping format of the DMRS for the data transmission.

4. The feedback information transmission method according to claim 1, wherein generating the pseudo-random number comprises:
   initializing a pseudo-random sequence by adopting the first identity or a second identity to obtain an initialized pseudo-random sequence;
   generating a sequence number according to a time domain unit in which the feedback information is located;
   generating the pseudo-random number according to the sequence number and the initialized pseudo-random sequence; and
   the second identity being different from the first identity.

5. A feedback information transmission method, being applied in a second terminal and comprising:
   selecting a basic sequence according to an information item of sidelink communication; and
   receiving feedback information of the sidelink communication transmitted by a first terminal according to the basic sequence;
   wherein selecting the basic sequence according to the information item of the sidelink communication comprises:
      generating a first identity according to the information item of the sidelink communication;
      performing the first identity mod n to obtain a group number of the basic sequence, the n being a group number of candidate basic sequences; and
      selecting the basic sequence according to the group number; and
   wherein selecting the basic sequence according to the group number comprises:
      selecting a first basic sequence when the basic sequence corresponding to the group number comprises the first basic sequence;
      selecting the first basic sequence, or selecting a second basic sequence when the basic sequence corresponding to the group number comprises the first basic sequence and the second basic sequence; or
      generating a pseudo-random number when the basic sequence corresponding to the group number comprises a first basic sequence and a second basic sequence; and selecting the first basic sequence or the second basic sequence according to the pseudo-random number.

6. The feedback information transmission method according to claim 5, wherein the information item of the sidelink communication comprises at least one of the following information items:
   a source ID of sidelink unicast communication;
   a source ID of sidelink multicast communication;
   a destination ID of the sidelink unicast communication;
   a destination ID of the sidelink multicast communication;
   a part of bit fields, bit fields or a combination of bit fields of Sidelink Control Information (SCI) of the sidelink unicast communication;
   a part of bit fields, bit fields or a combination of bit fields of SCI of the sidelink multicast communication;

location information of a time-frequency resource used for SCI transmission of the sidelink unicast communication;
location information of a time-frequency resource used for SCI transmission of the sidelink multicast communication;
location information of a time-frequency resource used for data transmission of the sidelink unicast communication;
location information of a time-frequency resource used for data transmission of the sidelink multicast communication;
a physical layer parameter used for the SCI transmission of the sidelink unicast communication;
a physical layer parameter used for the SCI transmission of the sidelink multicast communication;
a physical layer parameter used for the data transmission of the sidelink unicast communication; and
a physical layer parameter used for the data transmission of the sidelink multicast communication.

7. The feedback information transmission method according to claim 6, wherein the physical layer parameter used for the SCI transmission comprises at least one of the following parameters:
a sequence number of a Demodulation Reference Signal (DMRS) for the SCI transmission;
a time-frequency resource mapping format of the DMRS for the SCI transmission; and
a bit length of the SCI.

8. The feedback information transmission method according to claim 6, wherein the physical layer parameter used for the data transmission comprises at least one of the following parameters:
a sequence number of a Demodulation Reference Signal (DMRS) for the data transmission; and
a time-frequency resource mapping format of the DMRS for the data transmission.

9. The feedback information transmission method according claim 5, wherein generating the pseudo-random number comprises:
initializing a pseudo-random sequence by adopting the first identity or a second identity to obtain an initialized pseudo-random sequence;
generating a sequence number according to a time domain unit in which the feedback information is located;
generating the pseudo-random number according to the sequence number and the initialized pseudo-random sequence; and
the second identity being different from the first identity.

10. A feedback information transmission method, comprising:
receiving configuration information of an access network device, wherein the configuration information is generated according to information items of sidelink communication;
determining a basic sequence according to the configuration information;
generating feedback information of sidelink communication according to the basic sequence; and
transmitting or receiving the feedback information;
wherein determining the basic sequence according to the configuration information comprises:
generating a first identity according to the information items of the sidelink communication;
performing the first identity mod n to obtain a group number of the basic sequence, the n being a group number of candidate basic sequences; and
selecting the basic sequence according to the group number; and
wherein selecting the basic sequence according to the group number comprises:
selecting a first basic sequence when the basic sequence corresponding to the group number comprises the first basic sequence;
selecting the first basic sequence, or selecting a second basic sequence when the basic sequence corresponding to the group number comprises the first basic sequence and the second basic sequence; or
generating a pseudo-random number when the basic sequence corresponding to the group number comprises a first basic sequence and a second basic sequence; and selecting the first basic sequence or the second basic sequence according to the pseudo-random number.

11. A terminal, comprising:
a processor;
a transceiver connected to the processor; and
wherein the processor is configured to load and execute executable instructions to implement the feedback information transmission method of claim 1.

12. A non-transitory computer-readable storage medium for storing at least one at least one instruction, at least one program, a code set or an instruction set, wherein the at least one instruction, at least one program, code set or instruction set is loaded and executed by a processor to implement the feedback information transmission method of claim 1.

13. A terminal, comprising:
a processor;
a transceiver connected to the processor; and
wherein the processor is configured to load and execute executable instructions to implement the feedback information transmission method of claim 5.

14. A non-transitory computer-readable storage medium for storing at least one at least one instruction, at least one program, a code set or an instruction set, wherein the at least one instruction, at least one program, code set or instruction set is loaded and executed by a processor to implement the feedback information transmission method of claim 5.

* * * * *